3,031,471
NEW 15,17-DISUBSTITUTED 1,3,5(10)-ESTRATRI-
ENS AND METHODS OF PREPARING THE SAME
Seymour Bernstein, New City, and Edward W. Cantrall,
Pearl River, N.Y., and Ruddy Littell, River Vale, N.J.,
assignors to American Cyanamid Company, New
York, N.Y., a corporation of Maine
No Drawing. Filed Oct. 24, 1961, Ser. No. 147,151
10 Claims. (Cl. 260—397.4)

This invention relates to new steroid compounds. More particularly, it relates to substituted estrones and estradiols and methods of preparing the same.

The novel steroids of the present invention may be illustrated by the following formula:

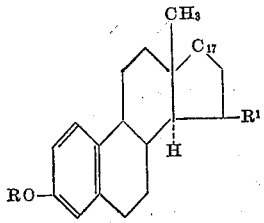

wherein R is selected from the group consisting of hydrogen and lower alkyl radicals, $R^1$ is selected from the group consisting of diloweralkylamino and cyano radicals and $C_{17}$ is a divalent radical selected from the group consisting of

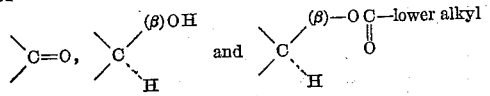

radicals.

The present compounds are, in general, white crystalline solids relatively insoluble in water but soluble in methanol, ethanol, ethyl acetate, acetone and the like.

The compounds of the present invention having a keto group in the 17-position usually described as estrone derivatives can be prepared by reacting the steroid 3-methoxy-1,3,5(10),15-estratetraen-17-one with a nucleophilic reagent such as an alkali metal cyanide or a secondary amine such as dimethylamine, diethylamine, dipropylamine and the like. The preparation of the starting material 3-methoxy-1,3,5(10),15-estratetraen-17-one is described hereinafter and in our copending application Serial No. 147,150, filed October 24, 1961, in which application the corresponding 3-hydroxy steroid is described and claimed as a new compound.

The 17-hydroxy steroids of the present invention usually described as substituted estradiol derivatives can be prepared by reducing the corresponding estrones described above with sodium borohydride, potassium borohydride, lithium aluminum hydride or the like.

The compounds of the present invention are pharmacologically active. They are useful in the treatment of hypercholesterolemia and disorders associated therewith. Their biological activity is selective and they can achieve other responses of the estrogenic hormones without producing a corresponding feminization. The compounds are therefore useful in the treatment of cardiovascular and circulatory disorders often associated with or indicated by higher content of cholesterol in the animal system. They are useful as intermediates in the preparation of other estrones and estradiols as will be apparent to those skilled in the art.

The following examples describe in detail the preparation of representative substituted estrones and estradiols of the present invention.

EXAMPLE 1

Preparation of 15β-Cyano-3-Methoxy-1,3,5(10)-
Estratrien-17-one

A solution of 200 mg. of 15-dehydroestrone methyl ether in 7 ml. of tetrahydrofuran containing 5 drops of water is treated with 500 mg. of sodium cyanide and the mixture is refluxed for 2.5 hours. Upon cooling, the mixture is poured into ice water and the resulting precipitate, 200 mg., melting point 131–135° C., is collected by filtration. Three crystallizations from ether give the pure 15-cyano product, melting point 154–155° C.

EXAMPLE 2

Preparation of 15β-Cyano-3-Hydroxy-1,3,5(10)-
Estratrien-17-one

A solution of 1.2 g. of 16-bromoestrone acetate and 220 mg. of p-toluenesulfonic acid monohydrate in 60 ml. of toluene and 5 ml. of ethyleneglycol is distilled slowly through a Vigreux column for 44 hours. (Total distillate 45 ml.) The reaction mixture is cooled, neutralized with saturated sodium bicarbonate solution diluted with ethyl acetate, washed with saturated saline, dried and evaporated. Crystallization of the crude residue from methanol gives 825 mg. of white crystals, melting point 234–236° C. whose infrared absorption spectrum shows complete absence of acetate or carbonyl bonds. Two further crystallizations from the same solvent gives the pure bromoketal, melting point 246–247° C.

A solution of 400 mg. of potassium in 20 ml. of t-butyl alcohol is evaporated when 20 ml. of xylene is added and the evaporation is repeated. A solution of 600 mg. of the bromoketal in 40 ml. of xylene is added to the potassium t-butoxide and the mixture is heated under reflux in an atmosphere of nitrogen for 18 hours. Upon cooling, the mixture is diluted with ether, washed with saturated saline, dried and evaporated to give 275 mg. of a pasty solid which is crystallized from methanol to give 130 mg. of white crystals, melting point 215–219° C. Two additional crystallizations from acetone-petroleum ether gives the pure ketal tetraene, melting point 218–220° C.

A solution of 1.0 g. of 17-ethylenedioxy-1,3,5(10),15-estratetraen-3-ol and 60 mg. of p-toluenesulfonic acid monohydrate in 70 ml. of acetone and 12 ml. of water is stirred at room temperature for 1.5 hours. The solution is then diluted with 350 ml. of ether, washed once with dilute sulfuric acid, once with dilute sodium bicarbonate solution and finally with saturated saline. After evaporation of the solvents, the resulting solid is crystallized from methanol to give 475 mg. of 15-dehydroestrone, melting point 249–251° C. Further crystallization of the product from methanol and from chloroform-methanol gives the pure sample, melting point 250–252° C.

To a solution of 250 mg. of 15-dehydroestrone in 10 ml. of tetrahydrofuran containing 7 drops of water is added 700 mg. of sodium cyanide and the mixture is refluxed for 3 hours. After cooling, the reaction mixture is poured into ice water and the resulting precipitate filtered to give 180 mg. of 15β-cyanoestrone, melting point 260–265° C. Two crystallizations from methanol gives the pure product, melting point 274–276° C.

EXAMPLE 3

*Preparation of 15β-Cyano-1,3,5(10)-Estratriene-3,17β-Diol*

A solution of 280 mg. of 15β-cyanoestrone and 200 mg. of sodium borohydride in 5 ml. of tetrahydrofuran and 35 ml. of methanol is stirred at room temperature for 2 hours. Water is added and 245 mg. of a white powder, melting point 280–282° C. is collected by filtration. Two crystallizations from methanol give pure 15β-cyanoestradiol, melting point 284–286° C.

The above compound when reacted with methyl iodide, potassium carbonate and ethyl alcohol produces the corresponding 3-methyl ether which on heating with pyridine and acetic anhydride produces 17β-acetoxy-15β-cyano-3-methoxy-1,3,5(10)-estratriene.

EXAMPLE 4

*Preparation of 15β-Dimethylamino-3-Methoxy-1,3,5(10)-Estratrien-17-one*

A solution of 300 mg. of 15-dehydroestrone methyl ether in 4 ml. of tetrahydrofuran and 6 ml. of dimethylamine containing 0.4 ml. of 25% aqueous potassium hydroxide is stirred at room temperature in an atmosphere of nitrogen for 20 hours. The reaction mixture is diluted with ether, washed three times with saturated saline, dried and evaporated at room temperature to give 260 mg. of the 15β-dimethylamine derivative, melting point 115–117° C. Crystallization of the product from ether-petroleum ether and from methanol does not alter the melting point.

We claim:

1. A compound of the formula:

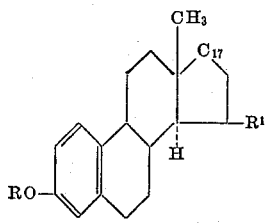

wherein R is selected from the group consisting of hydrogen and lower alkyl radicals, $R^1$ is selected from the group consisting of diloweralkylamino and cyano radicals and $C_{17}$ is a divalent radical selected from the group consisting of

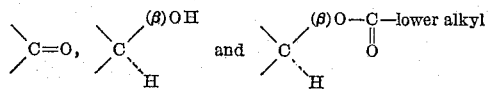

radicals.

2. The compound 15β-cyano-3-methoxy-1,3,5(10)-estratrien-17-one.

3. The compound 15β-cyano-3-hydroxy-1,3,5(10)-estratrien-17-one.

4. The compound 15β-cyano-1,3,5(10)-estratrien-3,17β-diol.

5. The compound 15β-dimethylamino-3-methoxy-1,3,5(10)-estratrien-17-one.

6. A method of preparing a compound of the formula:

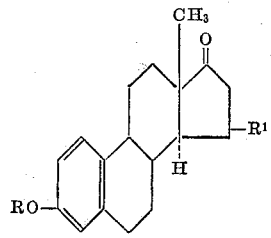

wherein R is selected from the group consisting of hydrogen and lower alkyl radicals and $R^1$ is selected from the group consisting of diloweralkylamino and cyano radicals which comprises reacting a steroid of the formula:

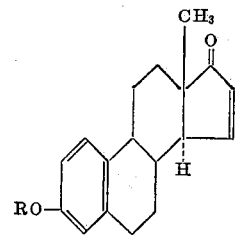

wherein R is as defined above with a member selected from the group consisting of alkali metal cyanides and diloweralkylamines and recovering said compounds therefrom.

7. A method according to claim 6 wherein the resulting product is subsequently reacted with a compound selected from the group consisting of alkali metal borohydrides and lithium aluminum hydride and the corresponding 17-hydroxy steroid recovered therefrom.

8. A method of preparing 15β-cyano-3-methoxy-1,3,5(10)-estratrien-17-one which comprises heating 15-dehydroestrone methyl ether with an alkali metal cyanide in the presence of a solvent inert to the reactants and recovering said compound therefrom.

9. A method of preparing 15β-diloweralkylamino-3-methoxy-1,3,5(10)-estratrien-17-one which comprises contacting 15-dehydroestrone methyl ethers with a diloweralkylamine in a solvent inert to the reactants and recovering said compound therefrom.

10. A method of preparing 15β-dimethylamino-3-methoxy-1,3,5(10)-estratrien-17-one which comprises contacting 15-dehydroestrone methyl ethers with dimethylamine in a solvent inert to the reactants until a significant amount of said product is obtained and recovering said product therefrom.

No references cited.